Nov. 2, 1926.  1,605,346
E. HERRMANN ET AL
ELASTIC VEHICLE WHEEL
Filed June 12, 1926
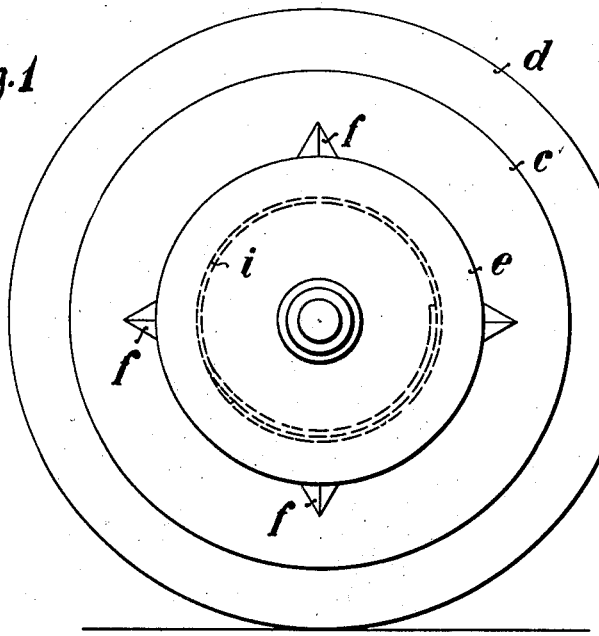
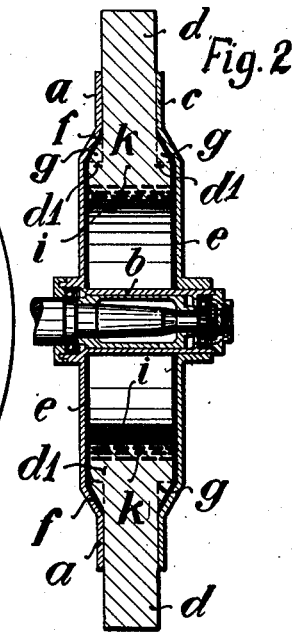
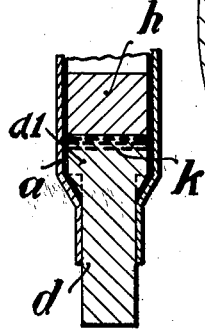
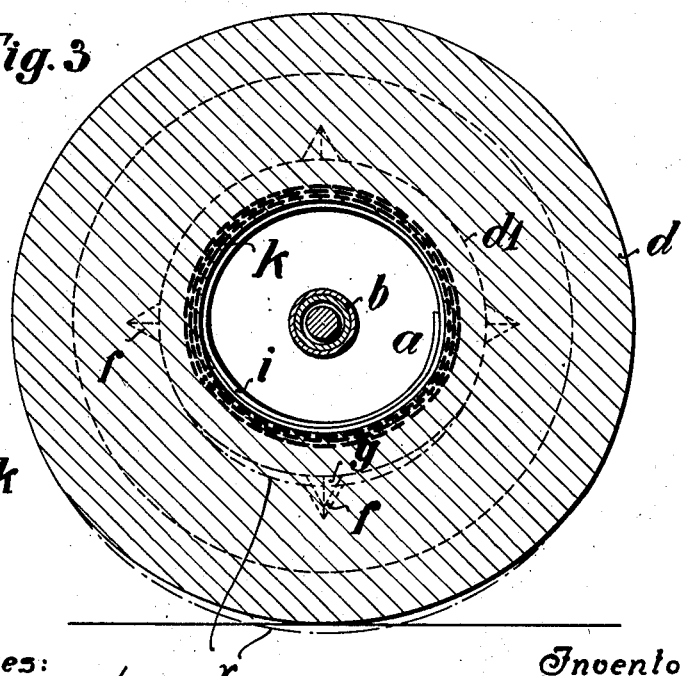
Inventors:
Emil Herrmann
Karl Kaufmann Patented Nov. 2, 1926.

1,605,346

UNITED STATES PATENT OFFICE.

EMIL HERRMANN AND KARL KAUFMANN, OF MULHEIM-RUHR, GERMANY.

ELASTIC VEHICLE WHEEL.

Application filed June 12, 1926, Serial No. 115,612, and in Germany March 10, 1925.

This invention relates to an improved elastic vehicle wheel, which essentially comprises an annular rubber rim having a thickened inner part and held between two metal discs having bulgings corresponding to and loosely embracing said thickened rubber rim part so that the rubber rim which freely projects with its weaker outer part from said discs can freely move therein in radial and inward direction, one of said discs being integral with the wheel hub and the other detachable from the latter and fixed thereon in any appropriate manner while means are provided for preventing a displacement of the rubber rim in tangential direction.

The accompanying drawing illustrates the improved elastic vehicle wheel: Fig. 1 is a side view of the same, Figs. 2 and 3 are respectively a central cross section, and a longitudinal section, therethrough, while Fig. 4 shows a detail in cross-section to a modified form of the same.

The rear discs $a$ is integral with the wheel hub $b$, while the front disc $c$ is fixed on the latter in any detachable manner, both discs being provided with bulgings $e$. The annular rubber rim $d$ has a thickened inner part $d^1$ corresponding to said bulgings $e$ by which it is loosely embraced in such a way that the rubber rim can freely move therein in radial and inward direction, the weaker outer part of the rubber rim being partly loosely embraced by the non-bulged outer parts of said discs and partly projecting freely therefrom, said projecting rim part forming the tread of the vehicle wheel.

To prevent a displacement of the rubber rim in tangential direction, wedge-shaped inner projections $f$ are provided on the outer edges of the bulgings $e$ and in engagement with corresponding recesses $g$ in the rubber rim.

If desired, a separate elastic annular body consisting of a rubber ring $h$ (Fig. 4), or of a strong spiral blade spring $i$ (Figs. 2 and 3), may be placed on the inner circumference of the rubber rim to increase the elastic action of the latter.

To strengthen the inner circumference of the rubber rim, linen insertions $k$ are provided therein.

When the wheel is loaded, its lower part is eccentrically compressed, while moving inwards between the discs $a$, $c$, as shown in Fig. 3, the dot-and-dash lines $x$ in said figure indicating the normal wheel position.

What we claim, is:—

An elastic vehicle wheel, comprising an annular rubber rim having a thickened inner part, two metal discs having bulgings corresponding to and loosely embracing said thickened rubber rim part so that the rubber rim can freely move therein in radial and inward direction, the weaker outer part of the rubber rim being partly loosely embraced by the non-bulged outer parts of said discs and partly projecting freely therefrom to form the tread of the wheel, a wheel hub integral with one of said discs and on which the other disc is fixed in detachable manner, strengthening linen insertions in the inner circumference of said rubber rim, and means for preventing a displacement of said rubber rim in tangential direction, consisting of wedge-shaped inner projections on the outer edges of the bulgings of said discs and of corresponding recesses in said rubber rim engaging with said projections.

In testimony whereof we have hereunto set our hands.

EMIL HERRMANN.
KARL KAUFMANN.